United States Patent

[11] 3,562,543

| | | |
|---|---|---|
| [72] | Inventor | Joze Sacer<br>Neuenhof, Switzerland (4153 Reinach/B1<br>Zikluckerstr., 24, Switzerland) |
| [21] | Appl. No. | 538,457 |
| [22] | Filed | Mar. 23, 1966 |
| [45] | Patented | Feb. 9, 1971 |

[54] PROCEEDING OF CONSTRUCTION OF AN ELECTRICAL NETWORK
7 Claims, 13 Drawing Figs.

| [52] | U.S. Cl. | 307/11 |
|---|---|---|
| [51] | Int. Cl. | H02j 1/00 |
| [50] | Field of Search | 307/57, 85, 86, 87, 11, 12, 42, 43, 44, 45, 18, 19, 21, 27 |

[56] References Cited
UNITED STATES PATENTS 3,229,110  1/1966  Kleinbach et al  307/57

*Primary Examiner*—Robert K. Schaefer
*Assistant Examiner*—H. J. Hohauser

ABSTRACT: An electrical power supply network having a main power supply line extending from a power supply station to consumer or distributing stations according to a predetermined geometrical configuration designed to result in the distribution of electricity in the most economical manner.

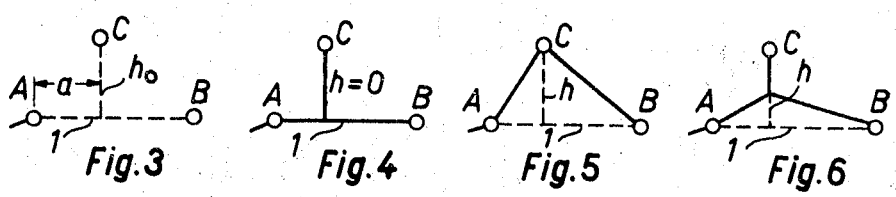
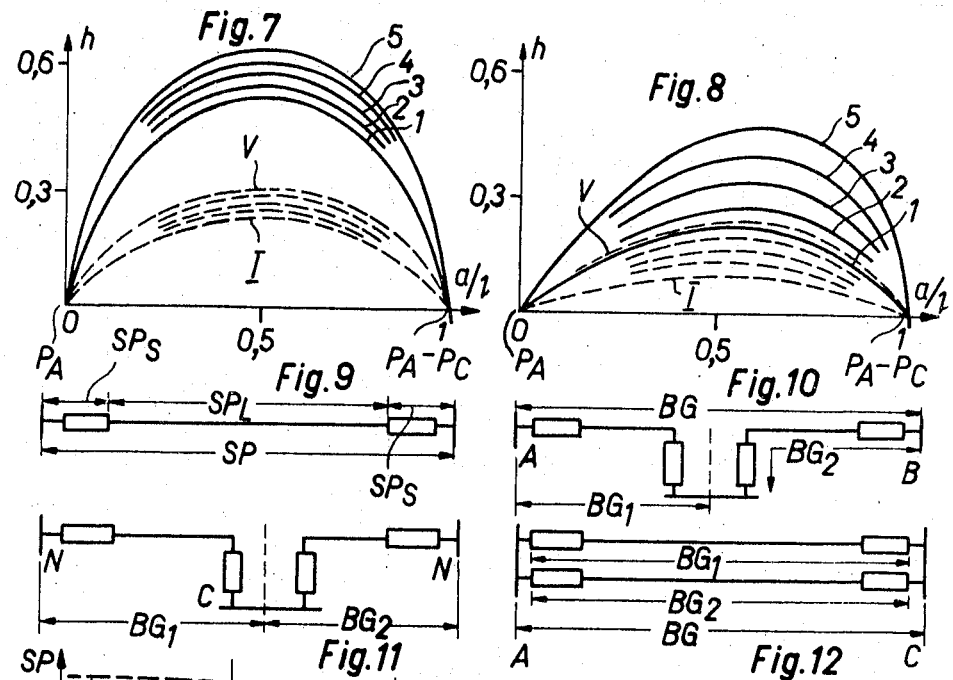
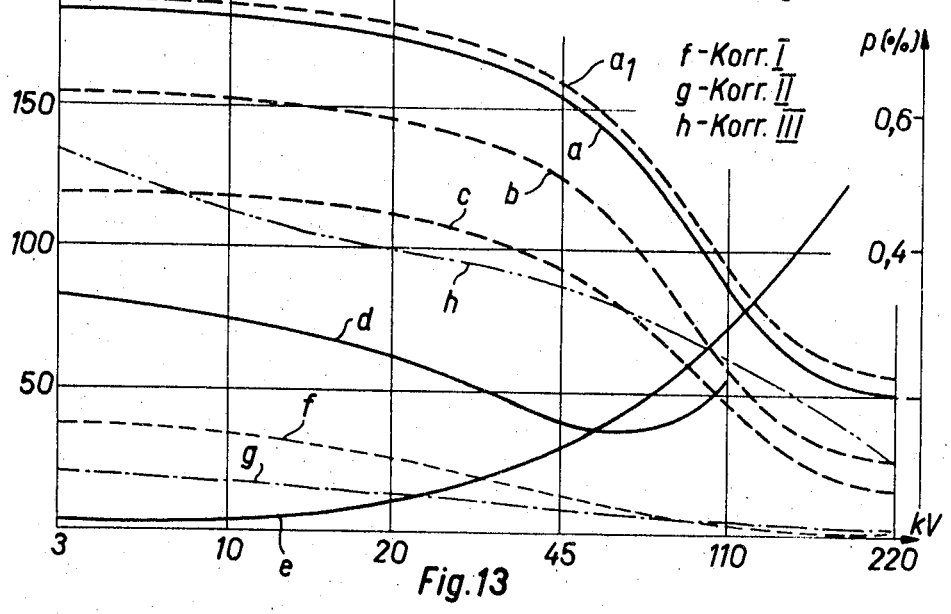

3,562,543

PROCEEDING OF CONSTRUCTION OF AN ELECTRICAL NETWORK

The invention relates to electrical power supply networks and process of constructing such networks.

According to the invention, there is provided an electrical power supply network, comprising at least one main power supply line extending from a power supply station to consumer or distributing stations, the main powerline or a branch powerline departing from an as first considered station to an as second considered station respectively diverging not more than a perpendicular distance $h$ from a straight line interconnecting the first and a third station on this line for which distance $h$ the first derivation by $h$ of the total costs depending on the powerline guide between the three stations is zero, and by branching at the distance $h$ a branch or switch line if the second station is farther away.

According to the invention, there is also provided an electrical power supply network, comprising at least one main power supply line extending from a power supply station to consumer or distributing stations, the main power supply line or a branch power supply line departing from an as first considered station to an as second considered station respectively diverging not more far than a perpendicular distance $h$ from a straight line interconnecting the first and a third station, for which distance $h$ the first derivation by $h$ of the total costs, depending on the powerline guide between the three stations is zero, whereby a center of summary power of any possible number of remaining stations successively serves as a fictive third station if there is more than one third remaining station to connect to this power line.

According to the invention, there is further provided a process of constructing an electrical power supply network, comprising a plurality of main power supply lines extending from a power supply station ES into respective main sectors $\alpha$ of a national circle centered on the supply source ES each main powerline $HL_i$ supplying directly or via branch lines the stations in the respective main sectors $\alpha_i$, the two radial boundaries Gr of which main sector being situated in two subsectors $\beta$ including a lower number of stations with minor summary power than other subsectors of the main sector on an average, whereby the two radial boundaries include stations needing enough power for economical cross section of conductors of a main line and no one of boundaries Gr as a rule includes an angle greater than 60° with a line SB interconnecting the supply station ES and the center of total power of this sector.

According to the invention, there is also provided a process of constructing an electrical power supply network, comprising a plurality of main power supply lines extending from a power supply station ES into respective main sectors $\alpha_i$ of a notional circle centered on the supply source ES each main powerline $HL_i$ supplying directly or via branch lines the stations in the respective main sector $\alpha_i$, the two radial boundaries Gr of which main sector being situated in two subsectors $\beta$ including a lower number of stations with minor summary power than other subsectors of the main sector on an average, whereby each station (Cn, Cm) in the boundary-reach of the main sector is connected to a powerline not in the proper but in the neighboring main sector if such a connecting line is shorter and if the shortening is not smaller than four times the eventual prolongation of the transmission way, measured from ES, of the energy for the respective station.

According to the invention, there is further provided a process of constructing an electrical power supply network, comprising a plurality of main power supply lines extending from a power supply station ES into respective main sectors $\alpha_i$, each main powerline $HL_i$ supplying directly or via branch lines the stations in the respective main sectors $\alpha_i$ as a rule and exceptionally also the stations in boundary-reach of neighboring sectors, adjacent stations connected to two different main powerlines being also interconnected by an interconnection powerline BG-Li there, where the annual costs for the interconnection power line BG-Li are smaller than the annual value of advantage gained by the increase of the operational reliability $BG_i$ of all stations looped in by this interconnection line.

According to the invention, there is also provided a process of constructing an electrical power supply network, comprising at least one main power supply line extending from a power supply station ES and supplying directly or via branch lines the consumer or distributing stations, any material for a raising of the operational reliability of the stations being built in there where the annual costs for this material are smaller than the annual value of advantage gained by the increase of the operational reliability of relative stations by this material, which value of advantage is beforehand found out by a method designating the time of power cuts of stations on account of defects.

An electrical power supply network embodying the invention, the process of constructing the network and the method making possible the constructing of the network according to the invention, will now be described, by way of example only, with reference to the accompanying diagrammatic drawings in which:

FIGS. 3 to 6 show, in more detail, one of the principles involved in constructing the network;

FIGS. 7 and 8 are graphs relating various factors for practical use in constructing the network; and FIGS. 9 to 13 show, in more detail, various elements and factors involved in the method of evaluation of the operational reliability in constructing the network.

Figure 1:
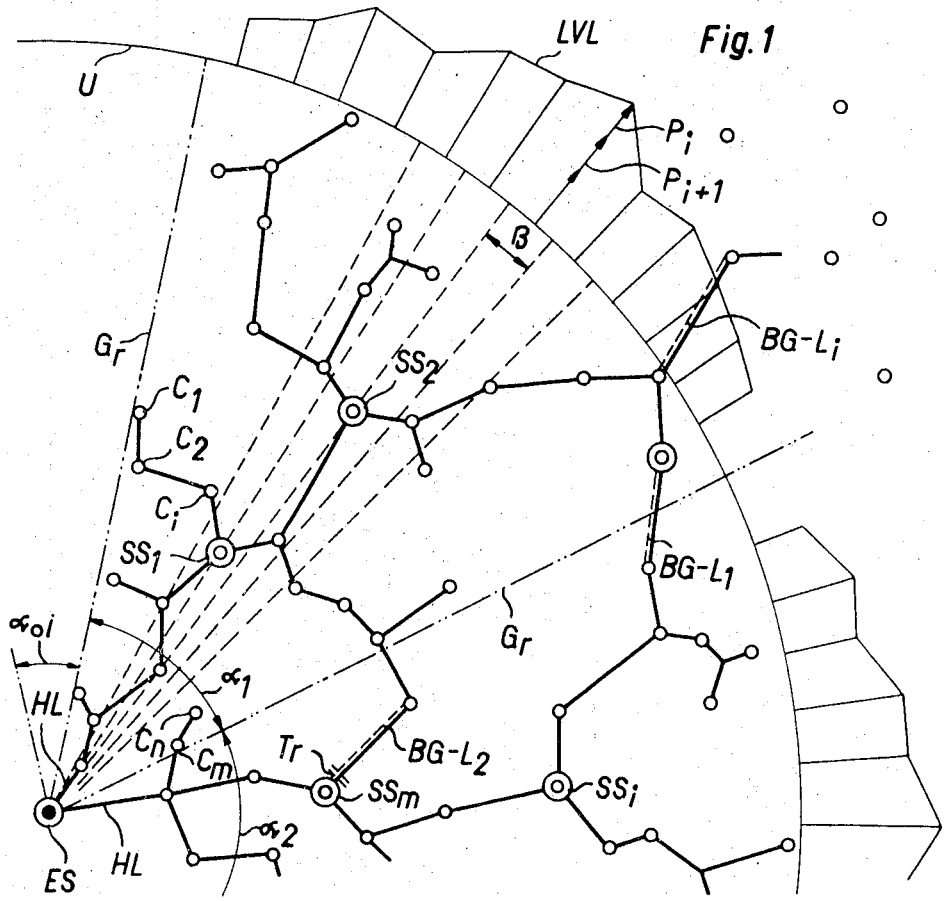
FIG. 1 shows a portion of the network, of a high voltage range.

FIG. 1 shows a portion of the network which comprises a power supply station ES having a plurality of main powerlines HL radiating therefrom and connecting to consumer or distributing stations $C_1, C_2 .... C_i$ having respective average power demands of $P_1, P_2 .... P_i$. The consumer stations are fed e.g. through switching stations $SS_1, SS_2 .... SS_i$. The layout of the network, and methods of determining the layout, will now be described.

Firstly, a circle centered on the power supply station ES and having a circumference U is drawn to enclose the area containing the consumer stations. The circle is then divided into a plurality of subsectors each subtending an arbitrarily chosen equal angle $\beta$. The total power requirement of the all the consumer stations in each of these subsectors is then indicated on the circumference U adjacent each subsector by a radial line of appropriate length. A line LVL is then drawn to connect the outer ends of these radial lines so as to indicate the distribution of power requirements over the area.

The circle is then divided into a number of main sectors each subtending an angle which is a multiple of the angle $\beta$. FIG. 1 shows one such main sector subtending an angle $\alpha_1$ defined by two radial lines Gr, and part of an adjacent main sector subtending an angle $\alpha_2$. The sizes of the main sectors are determined by the positioning of their boundary lines Gr which boundary lines have to include sufficient stations' power requirement such that a normalized cross section of the conductors of the main line in the sector may be economical. Each radial boundary line of a main sector is preferably positioned so that the power requirements of the main sector are more concentrated in the middle radially divided third of the sector than in the outer thirds, but an exception to this rule may be made where a main sector is relatively narrow and has a very concentrated power requirement, further each radial boundary line Gr has to be positioned so that the angle subtended between Gr and an interconnection SB from ES (FIG. 2) to the center of power B o in the sector is not greater than 60° whereby the center of power Bo is determined analogically to a center of gravity of a plurality of weights.

In fixing the number of main sectors, boundary areas of a sector in the circle, such as the sector subtending the angle $\alpha_{oi}$, where there are no power requirements, are ignored.

Each main sector $\alpha_i$ is provided with one main powerline $HL_i$ from the power supply station ES, and the course of this powerline is determined as will now be explained.

Figure 2:
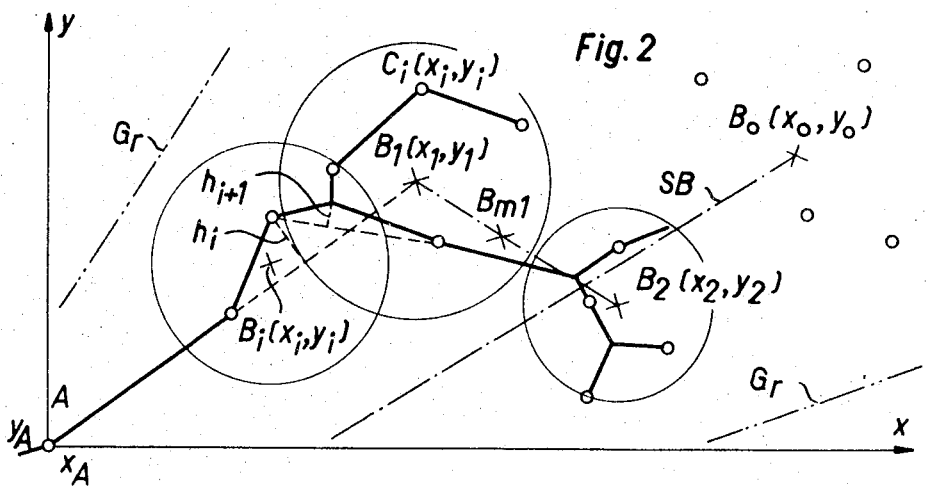
FIG. 2 shows a step in the planning of the route of a main powerline in the network.

The ratio of the number of consumer stations $C_i$ directly connected to the main powerline HL to the length of the powerline in the sector should be as great as possible, but the line passing respectively from a point A to a third point B should as a rule not exceed a certain optimal distance $h$ towards a station C as the second point; as indicated e.g. in FIG. 2 by $h_i+_1$.

In doing so A is successively another point of the line, C is successively another station to connect, and B is successively another station probably to be connected to this line or an arbitrarily chosen power center of a group of stations yet to connect, as indicated in FIG. 2 by $B_1$, $B_2$ ....$B_i$ with appropriate coordinates $(X_1, Y_1 ....X_i, Y_i)$. Sometimes it is useful to find out the middle power center of two or more groups, as indicated by $B_{m1}$ in FIG. 2, whereby it gives the power center of a part of sector in radial direction.

Where there is a station C more far than within the distance $h$ a branch or stich line departs to this station from the end of the relative distance $h$, as a branch point.

If a branch line conducts relatively a grand power for several remote stations this power retrogradely should be considered to be consumed at the branch point on the main line and corrections in determining of the power centers should be necessary; because it is obvious that the centers of power $B_1$, $B_2$ ....$B_i$ determining the course of the main line HL should consider only the stations to be connected to this line.

Reference is now made to FIGS. 3 to 6. In these FIGS. A represents the starting point, thus a station or a point on the line, C represents the station to be connected between A and B, B represents a station to be probably yet connected or a power center as a fictive station. The points A and B are separated by a distance $l = 1$ and point C is positioned at a perpendicular height $ho$ above a distance $a$ from the point A on a notional line joining points A and B, as shown in FIG. 3.

FIGS. 4, 5 and 6 show various ways in which the three points A, B and C can be joined by a power supply line demonstrated in full line, which line deviates to different perpendicular heights $h$; in FIG. 4 is $h = 0$, in FIG. 5 is $h = h_o$, and FIG. 6 illustrates an intermediate value for $h$.

The optimum value for $h$ depends on costs for material and energy losses, on the distance $a$ as a fraction of the distance $l = 1$ between A and B and on the ratio $P_C/P_A$ where $P_A$ is the power on the line at the point A and $P_C$ is the power consumed at point C, including of course the power consumed at any other point connected to point C by a branch line.

FIG. 7 and FIG. 8 illustrate graphs of $h$ for different values of the ratio $P_C/P_A$ for use without a computer. The values $h$ are represented as a fraction of the distance $l$ between A and B in dependence upon the distance $a$ as a fraction of the same distance $l$ between A and B. The point 0 for $a$ corresponds therefore to the point A which is represented with the value of power $P_A$; the point 1 for $a$ corresponds to the point B which is represented with the value of power $P_A-P_C$.

Curves 1 to 5 in FIG. 7 and FIG. 8 give the optimal $h$ according connection in FIG. 6 for different power ratios $P_C/P_A$ of 0.1, 0.2, 0.3, 0.4, 0.5.

Curves 1 to 5 in FIG. 7 and FIG. 8 give the distance $h$ for which the costs of connection according FIG. 4 are equal to connection according FIG. 5.

The curves in FIG. 7 are calculated for a ratio $S_L/S_M = 0,1$, where $S_L$ is the annual cost of the electrically conducting parts of the powerlines, and where $S_M$ is the annual cost of purely mechanical parts of the powerlines; FIG. 8 corresponding shows curves for the case where the ratio $S_L/S_M = 1,2$.

The curves 1 to 5 are determined by setting the first derivation by $h$ of total costs for the lines according FIG. 6 equal zero $$\left(\frac{dSA, B, C}{dh} = 0\right)$$

which yields the condition for a minimum of costs, whereby some simplifications were made (as f.e. by setting the costs for energy losses equal to costs $S_L$).

The principle of optimal distances $h$ discussed with reference to FIGS. 3 to 8 is used to determine the optimum path of the powerline to the consumer stations shown in FIG. 2 and described beforehand.

It will be appreciated that, if the point C should comprise a switching station, as e.g. $SS_i$ in FIG. 1, to arise the operational reliability, it may be advantageous to exceptionally arrange the path of the powerline in the manner shown in FIG. 5 even if the optimal $h$ shows that the path should be in the form as shown in FIG. 6.

Where consumer or distributing stations lie substantially spaced from the route of the main powerline, secondary and possibly tertiary branch lines arise by using the principles already described, so as to connect to these stations by the optimum route or as near as possible thereto.

Where local and geographical conditions within an area do not favour the planned optimum route of the powerline, the next most favourable route is chosen.

A cross-connection of a station in a boundary reach of a sector to a powerline in an adjacent sector, as shown in FIG. 1 by $C_m$ and $C_n$, is to be made there, where such a cross-connection line is shorter than a connection to a powerline with origin on the main line of the proper sector. It may occur that even a second and a third station having a shorter connection to such a cross-connection line are to connect in this way. In doing so successively such connections are to stop there, where the total transmission way of the energy for the relative station—taking into consideration the total way back to the supply source—increase to much by way of the extraneous main line; this is the case if this prolongation is about four times greater than the shortening of the connection line by the connection of the station to the extraneous main line. When the routes for the powerlines have been determined in this way the necessary measures to increase its operational reliability are to make, for no electrical network can be optimally built in economical view without examining beforehand exactly its operational reliability in each point which operational reliability is an important factor in the network and much codetermining in the construction of it, although even a relative exact method was not existing.

Such measures of increasing the operational reliability can take the form of interconnecting neighboring powerlines, using duplicated powerlines, earthing a neutral point by way of a Peterson coil, a provision of overhead earth wires, a use of rapidly operating circuit breakers, an exceptional strengthening of insulation, a use of lightning arresters and a provision of reserve power capacity or reserve material for the case of a damage or a fault.

FIG. 1 shows two lines $BG-L_1$ and $BG-L_2$ which interconnect the powerline in one main sector with the powerline in adjacent sector. Such interconnections produce a financial saving which is given by the expression $$S = \Sigma p_i \cdot C_{i_a} \cdot 8760 \cdot \frac{(BG_{\text{III}i} - BG_{\text{II}i})}{BG_{\text{II}i} \cdot BG_{\text{III}i}}$$

where $P_i$ is a general expression for the average power consumption in the respective distributing or consumption station $C_i$ along the loop completed by the connection line, $C_i$ is a general expression for the cost, per kilowatt hour, involved when the respective station is out of action due to damage or a fault, $BG_{II}$ is a general expression for the operational reliability factor of each respective station $C_i$ when the connection BG-L is not present, and $BG_{III}$ is a general expression for the operational reliability factor of each respective station when the connection line BG-L is present.

The operational reliability factor for any particular station is defined as the ratio of the total possible operating time to the total duration of power cuts (f.e. belonging to damages or faults) within that time.

In order to determine whether any particular connection line BG-L is financially viable, the annual saving S, as calculated from equation above, is compared with $S_L+S_M$, the annual cost for the connecting loop BG-L, whereby the annual saving S should be greater and chosen relatively greatest possible.

A disconnecting plant $T_r$ (see FIG. 1 at connecting loop BG-$L_2$) may be provided to prevent excessive currents due to a short circuit and is closed only in the case of a need.

The same principle of comparison of cost as at a connecting loop may be chosen for any other material to be built in the network for the purposes to increase the operational reliability of parts of the network or of complete network.

Since the defined operational reliability is such new and important factor depending on many conditions and nobody skilled in the art has precisely a conception of its evaluation it may be necessary to explain the method of evaluation as following it is done with help of accompanying drawings in FIGS. 11 to 13.

The various conditions of the operational reliability of different parts of lines are reduced to a common specifically determining factor SP, which is arbitrarily chosen so that the value SP=100 yields annually 10 power cuts with a certain duration varying by geographical and other conditions. The curves in FIG. 13 give the factors SP depending on the voltage range KV of the line for:

$a_1$ - simple overhead powerline of 100 km. length
$a$ - as $a_1$ plus overhead earth wires
$b$ - as $a$ plus Petersen coil
$c$ - as $b$ plus rapidly operating circuit breakers
$d$ - cable lines of 100 km. length
$e$ - 10 pieces of the line end part in the switching stations The curves $f$, $g$ and $h$ give the correction factors (percentage) for the curves above.

The factor SP for a powerline according to FIG. 9 is determined by the sum of two $SP_s$'s for the two end parts of the line in the switching stations and of $SP_L$ for the line; $SP = 2 SP_s + SP_L$. In that manner the proper factor $BG_i$ of a line section is found out.

Two points A and B as shown in FIG. 10, distant by two line sections with their proper factors $BG_1$ and $BG_2$ differ in the factor BG given by the relation:

$$\frac{1}{BG}=\frac{1}{BG_1}+\frac{1}{BG_2}$$

A point C, connected by two line sections with their proper factors $BG_1$ and $BG_2$ to a network N differs in relation to the network N in the factor BG given principally by relation:

$$BG=BG_1, BG_2$$

A double powerline from point A to point C, as shown in FIG. 12, yields principally a difference in the factor BG between the points A and C as beforehand:

$$BG=BG_1 \cdot BG_2$$

whereby already corrections corresponding to the various conditions should be made.

I claim:

1. A process of constructing an electrical power supply network, comprising a plurality of main powerlines extending from a power supply station ES into respective main sectors $\alpha_i$ of a notional circle centered on the supply source ES, each main powerline $HL_i$ supplying directly or via branch lines the stations in the respective main sector $\alpha_i$, the two radial boundaries GR of which main sector $\alpha_i$ being situated in two subsectors $\beta$ including a lower number of stations with minor summary power than other subsectors of the main sector on an average, whereby the two radial boundaries include stations needing enough power for an economical cross section of conductors of a main line and no one of boundaries Gr as a rule includes an angle greater than 60° with a line SB interconnecting the supply source ES and a center $B_n$ as the center of the total power of the sector.

2. A process of constructing an electrical power supply network according to claim 1, in which each station in the boundary-reach of the main sector is connected to a powerline not in the proper but in the neighboring main sector if such a connecting line is shorter and if the shortening is not smaller than four times the possible prolongation of the from ES measured transmission way of the energy for the respective station.

3. A process of constructing an electrical power supply network according to claim 2, adjacent stations connected to two different main powerlines being also interconnected by an interconnection powerline BG-$L_i$ there, where the annual costs for the interconnection powerline are smaller than the value of advantage gained by the increasing of the operational reliability $BG_i$ of all stations looped in by this interconnection powerline.

4. A process of constructing an electrical power supply network according to claim 3, in which any material for an increasing of the operational reliability is built in there, where the annual costs for this material are smaller than the annual value of advantage gained by the increase of the operational reliability of relative stations by this material, which value of advantage is beforehand found out by a method predestinating the time of power cuts of stations on account of defects.

5. A process of constructing an electrical power supply network according to claim 4 in which is used a computer by therein described methods.

6. An electrical power supply network, comprising at least one main power supply line extending from a power supply station to many distributing stations, whereby the powerline departs from a successively first station A to a successively second station C in such a manner that it diverges from a straight line interconnecting the first station A and a third station B on this line not more than a perpendicular distance $h$, for which distance $h$ the first derivation $dS/dh$ of the total costs S, depending on the powerline conduction between the three stations A,C,B, is zero ($\frac{ds}{dh}=0$), and whereby from the distance $h$ a branch line departs to the second station C being farther away.

7. An electrical power supply network according to claim 6, in which a center of summary average power of any possible number of third stations which are yet to be connected to the respective powerline successively serves as a theoretical third station $B_i$ if there is more than only one third station to be connected to the respective main or branch powerline.